April 11, 1961     N. J. DANIELS     2,978,837
GRASS GUARD FOR TREES
Filed May 20, 1959
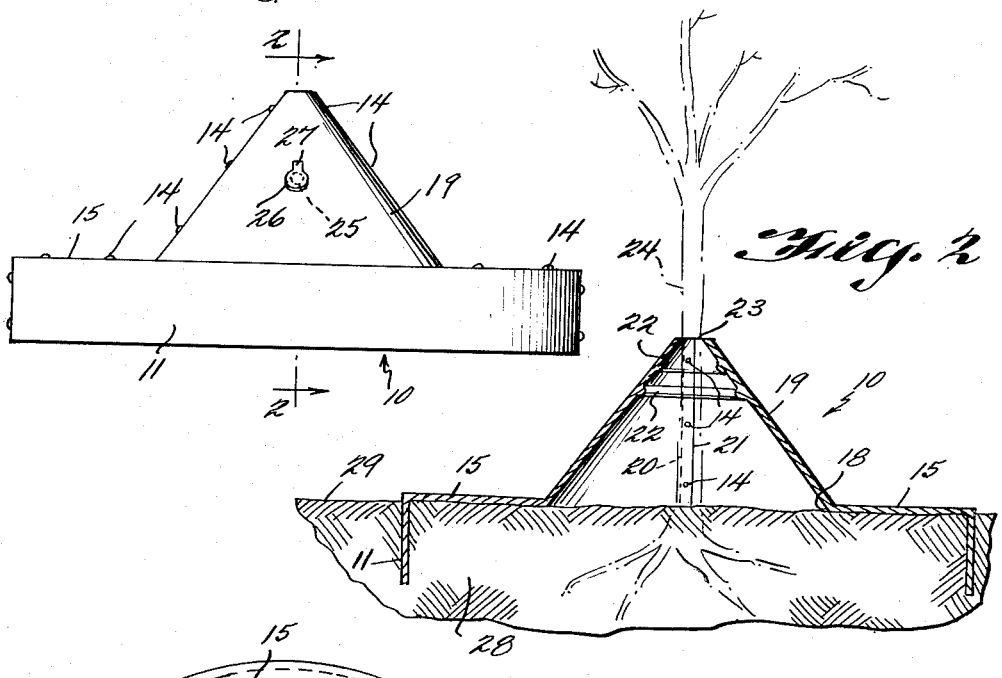
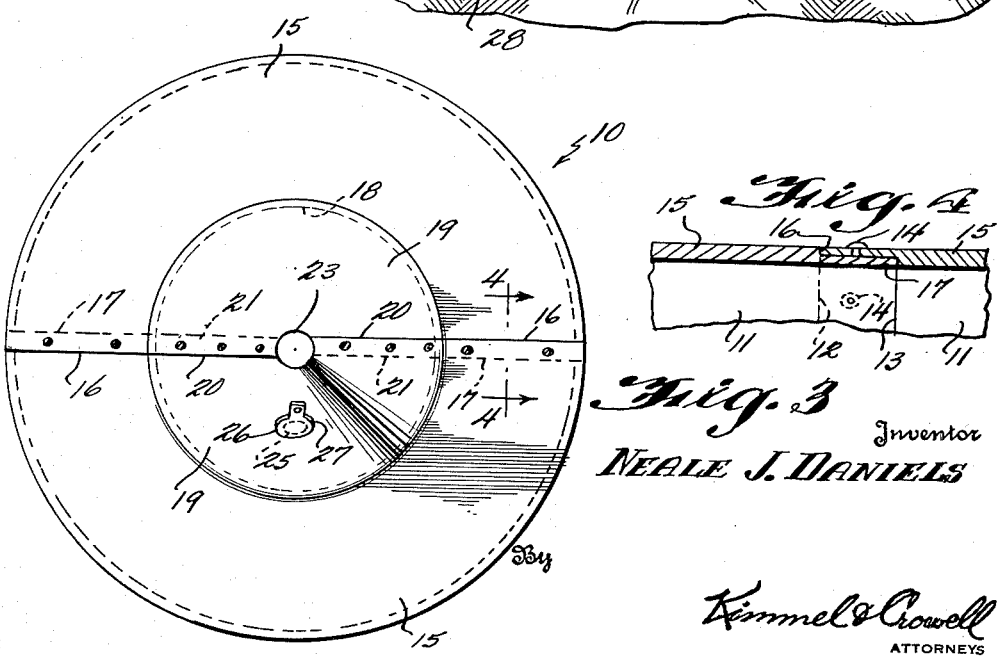
Inventor
NEALE J. DANIELS
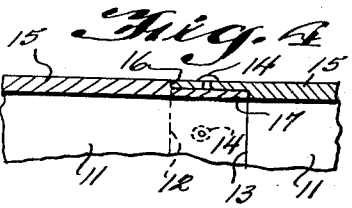
ATTORNEYS

United States Patent Office 2,978,837
Patented Apr. 11, 1961

2,978,837

GRASS GUARD FOR TREES

Neale James Daniels, 9310 Linden, Bloomington, Calif.

Filed May 20, 1959, Ser. No. 814,468

3 Claims. (Cl. 47—25)

The present invention relates to a grass guard for trees and particularly to a grass guard which can be applied to the base of a tree.

The primary object of the invention is to provide a grass guard which can be applied to the base of a tree to completely eliminate grass from growing on the ground closely adjacent the base of the tree.

Another object of the invention is to provide a grass guard of the class described above which is positioned so that grass growing adjacent thereto can be cut directly with a lawn mower, eliminating the necessity of trimming.

A further object of the invention is to provide a grass guard of the class described above which can be assembled in position surrounding the base of a tree.

Other objects and advantages will become apparent in the following specification when considered in light of the attached drawings, in which:

Figure 1 is a front elevation of the invention;

Figure 2 is a vertical sectional view taken along the line 2—2 of Figure 1, looking in the direction of the arrows;

Figure 3 is a top plan view of the invention shown assembled with the tree omitted; and Figure 4 is an enlarged fragmentary vertical section taken along the line 4—4 of Figure 3, looking in the direction of the arrows.

Referring now to the drawings in detail wherein like reference characters indicate like parts throughout the several figures, the reference numeral 10 indicates generally a grass guard for trees constructed in accordance with the invention.

The grass guard 10 while primarily intended for use with trees, can be constructed in various sizes and used with rose bushes and other plants, as well as with trees. The grass guard 10 includes a pair of semi-circular upstanding walls 11 having the adjacent ends 12, 13 thereof overlapped and secured together by screws 14.

A horizontal semi-circular base plate 15 is integrally secured to each of the walls 11 with the adjacent edges 16, 17 thereof arranged in overlapped relation and secured together with screw 14. The base plates 15 have a circular opening 18 formed centrally therein.

A pair of semi-conical members 19 are respectively secured to the inner edges of the base plates 15 and extend upwardly in inwardly converging relation therefrom. The semi-conical members 19 have their adjacent edges 20, 21 arranged in overlapping relation and secured together by screws 14.

The conical members 19 have generally horizontal circumferential ribs 22 integrally formed therein to reinforce the conical members 19. A circular opening 23 is formed in the upper end of the conical members 19 of a size to permit the trunk 24 of a tree to extend therethrough. One of the conical members 19 is provided with an access opening 25 through which the tree may be watered if desired.

A cover 26 is pivoted at 27 to the conical member 19 adjacent the aperture 25. The cover 26 is adapted to normally cover the aperture 25 and can be swung aside when watering the tree.

In the use and operation of the invention, the guard 10 is assembled with the tree trunk 24 projecting through the circular opening 23 and in this position the screws 14 are inserted to secure the guard 10 in assembled relation. The upright wall 11 is then forced into the ground 28 or is positioned in a trench dug for the purpose so that the base plates 15 engage the surface 29 of the ground 28. With the guard 10 in this position, no grass will grow under the base plates 15 or under the conical members 19 and the base plate 15 permits a lawn mower wheel to pass thereover to cut the grass growing on the surface 29 of the ground 28 adjacent to the guard 10 without the necessity of hand trimming.

Having thus described the preferred embodiment of the invention, it should be understood that numerous structural modifications and adaptations may be resorted to without departing from the scope of the appended claims.

What is claimed is:

1. A grass guard for trees comprising a flat horizontal base plate, a vertically disposed circular wall formed integrally with and depending from the peripheral edge of said base plate for engaging in the ground, and a conical member integrally formed on said base plate and extending upwardly therefrom, said conical member having a circular tree trunk passage opening formed in the upper inner end thereof, a plurality of generally horizontal circumferential ribs formed integrally with the inner surface of said conical member adjacent to and parallel with the upper end of said conical member for reinforcing said conical member, said circumferential ribs also forming demarkation lines for cutting off the upper end of said conical member to increase the circumference of the opening therein as the tree grows, said base plate and said conical member being formed of a pair of demountable sections.

2. A device as claimed in claim 1 wherein the demountable sections of said base plate and said conical member have the adjacent edges thereof overlapped and detachably secured together by a plurality of screws.

3. A device as claimed in claim 1 wherein access means are provided in said conical member to permit watering of said tree with said guard in position thereabout.

References Cited in the file of this patent

UNITED STATES PATENTS

| 313,424 | Hughes | Mar. 3, 1885 |
| 1,704,801 | Miller | Mar. 12, 1929 |

FOREIGN PATENTS

| 9,487 | Great Britain | June 19, 1890 |